(12) United States Patent
Williams et al.

(10) Patent No.: US 9,944,383 B2
(45) Date of Patent: Apr. 17, 2018

(54) PNEUMATIC YAW CONTROL EFFECTOR FOR AIRCRAFT

(71) Applicants: David R. Williams, Chicago, IL (US); Jürgen Seidel, Denver, CO (US)

(72) Inventors: David R. Williams, Chicago, IL (US); Jürgen Seidel, Denver, CO (US)

(73) Assignee: Illinois Institute of Technology, Chicago, IL (US)

( * ) Notice: Subject to any disclaimer, the term of this patent is extended or adjusted under 35 U.S.C. 154(b) by 67 days.

(21) Appl. No.: 15/052,558

(22) Filed: Feb. 24, 2016

(65) Prior Publication Data

US 2017/0088253 A1 Mar. 30, 2017

Related U.S. Application Data

(60) Provisional application No. 62/234,120, filed on Sep. 29, 2015.

(51) Int. Cl.
| | |
|---|---|
| *B64C 15/14* | (2006.01) |
| *B64C 39/02* | (2006.01) |
| *B64D 33/00* | (2006.01) |

(52) U.S. Cl.
CPC ............ *B64C 15/14* (2013.01); *B64C 39/024* (2013.01); *B64D 33/00* (2013.01)

(58) Field of Classification Search
CPC ........ B64C 15/14; B64C 33/00; B64C 39/024
See application file for complete search history.

(56) References Cited

U.S. PATENT DOCUMENTS

| | | | | |
|---|---|---|---|---|
| 2,451,008 A | * | 10/1948 | Williams | B64C 15/14 244/221 |
| 3,841,588 A | * | 10/1974 | Arnold | B64C 23/005 244/207 |
| 4,492,340 A | * | 1/1985 | Fieldus | B64C 15/14 137/883 |
| 4,896,846 A | * | 1/1990 | Strom | B64C 5/04 244/12.5 |
| 5,273,237 A | * | 12/1993 | Guyton | B64C 15/14 244/23 D |
| 5,927,645 A | * | 7/1999 | Latz | B64C 23/06 244/207 |

(Continued)

OTHER PUBLICATIONS

Valasek, J., et al., "High Speed, Low Angle-of-Attack Pneumatic Vortex Control" American Institute of Aeronautics and Astronautics, Inc., Copyright 1998, Report AIAA-98/4449, pp. 659-669.

*Primary Examiner* — Justin M Benedik
(74) *Attorney, Agent, or Firm* — Pauley Erickson & Kottis

(57) ABSTRACT

An apparatus and method for controlling a yaw moment of a flight vehicle, such as an aircraft. A wing structure of the flight vehicle has a first opening or actuator positioned by a first apex section of a first side of the wing, and has a second opening or actuator positioned away from or at a distance from a second apex section of a second side of the wing. The first side and the second side can each be positioned or located opposite a centerline of the wing or wing structure. A pressure source or other pressure supply device is in communication with the first opening or actuator and the second opening or actuator to which a pressurized fluid, such as air, is controlled and delivered to control or vary the yaw moment of the flight vehicle.

22 Claims, 14 Drawing Sheets

(56) References Cited

U.S. PATENT DOCUMENTS

| | | | | |
|---|---|---|---|---|
| 6,412,731 B1* | 7/2002 | Gabriel | ................... | B64C 15/14 |
| | | | | 244/12.1 |
| 9,162,754 B2* | 10/2015 | Boespflug | ............... | B64C 21/04 |
| 9,725,160 B2* | 8/2017 | Golling | ................. | B64C 21/025 |
| 2007/0029403 A1* | 2/2007 | Hassan | ................... | B64C 15/14 |
| | | | | 239/171 |
| 2009/0045294 A1* | 2/2009 | Richardson | ............. | B64C 3/385 |
| | | | | 244/7 A |
| 2011/0309201 A1* | 12/2011 | Hassan | ................... | B64C 15/14 |
| | | | | 244/207 |

\* cited by examiner

PNEUMATIC YAW CONTROL EFFECTOR FOR AIRCRAFT

CROSS REFERENCE TO RELATED APPLICATION

This Patent Application claims the benefit of U.S. Provisional Patent Application, Ser. No. 62/234,120, filed on 29 Sep. 2015, and is hereby incorporated by reference in its entirety and is made a part of this specification, including but not limited to those portions which specifically appear in this specification.

GOVERNMENT SUPPORT CLAUSE

This invention was made with government support under Grant/Contract Number(s) FA9550-16-1-0098 awarded by the Air Force Office of Scientific Research. The government has certain rights in the invention.

BACKGROUND OF THE INVENTION

Field of the Invention

This invention includes and relates to a device or apparatus and a procedure or method for controlling a yaw moment, such as on an aircraft, particularly at both relatively low and relatively high angles of attack.

Discussion of Related Art

Some known background technology related to this invention includes work completed in the late 1990's on forebody vortex control, which was applicable to axisymmetric missiles and slender aircraft at high angles of attack. Boeing, formerly McDonnell-Douglas, was working on a micro-jet technique similar to the work completed in the late 1990's on forebody vortex control.

There was technology related to a similar type of control using micro-air jets blowing through a pair of holes near the apex of an axisymmetric ogive-cylinder model at high angles of attack, in the late 1990's. There are several journal publications and a Ph.D. dissertation that discuss the method. Investigators at Boeing St. Louis, formerly McDonnell Douglas Corp., also investigated the micro-jet control technique on axisymmetric bodies. In all cases, the control only worked at high angles of attack (>30 deg.), because the jet control actuators were modifying a pair of vortices that had their origin at the nose of the axisymmetric body and required a separated flow behind the body. This invention is fundamentally different, at least, because the technology of this invention works at both low angles, even negative angles, of attack and high angles of attack. The control effect of this invention occurs by lowering the pressure on the surface of the aircraft in the vicinity of or near the jet slots. This invention is also different because some embodiments of this invention use two actuators or openings on opposite sides of the centerline of the flight vehicle to produce a relatively large or the largest yaw moment.

SUMMARY OF THE INVENTION

The actuators or device according to some embodiments of this invention includes four blowing slots, slots and/or openings in communication with pressurized fluids, located at or near a leading edge of one or more wings. As shown in FIG. 1, a pair of left side and right side slots or blowing slots are located at the apex of the swept wing model, and a second pair of slots were blowing slots is located farther downstream, for example, at a midspan position of the slots. At low angles of attack (0 deg to 20 deg), both left side actuators are activated to turn a nose to the left. In some embodiments of this invention, at angles of attack above 30 degrees, a cross-blowing method is used. In some embodiments of this invention, the cross-blowing method relates to the left-side apex actuator and the right-side midspan actuator being activated simultaneously to turn the nose to the left. This approach to or result for controlling yaw moment was not anticipated, and this invention is the first to recognize the power of the cross-blowing method, including for controlling yaw moment.

Conventional aircrafts use rudders and ailerons or split-ailerons, such as on tailless or rudderless aircraft, to control the yaw moment and horizontal direction of flight. In some embodiments of this invention, the pneumatic control effector of this invention uses jets of air communicating or passing through four slots located at or near the nose and midspan region on the leading edge of the wings, to create or affect yaw control, which can be used to replace a rudder. Conventional control surfaces, such as rudders and/or ailerons, become ineffective at high angles of attack, and are undesirable on stealth aircraft. The pneumatic control effectors of this invention can maintain horizontal directional control without the need for rudders and/or ailerons, particularly at angles of attack ranging from 0 degrees to at least 50 degrees.

Some embodiments of this invention can be used on tailless or rudderless aircraft with swept wings, which can be of particular interest to sectors of the industry developing stealth, highly maneuverable, unmanned air vehicles. The Lockheed Martin ICE-101 manned aircraft is one example of an aircraft that could benefit from the technology of this invention. Northrup Grumman, Boeing, British Aerospace, and EADS are developing similar unmanned air vehicles.

In some embodiments according to this invention, the air supply to power the actuators come from or are powered by an engine compressor. In some embodiments according to this invention, approximately 3 percent to 5 percent of the engine air would be needed for control, which is a disadvantage relative to conventional control effectors that do not use any or require no engine air. A plumbing and control system for the air supply would add complexity to the design of the aircraft. Airframers would need to be convinced that the complexity and cost of the bleed air system is offset by the increased controllability and increased stealth capability that could be achieved with the aircraft. Experiments and computer simulations have shown one unexpected benefit of an enhanced lift-to-drag ratio, which can be a key factor in determining the range and endurance of flight vehicles, in that about 50 percent of an increase in the lift-to-drag ratio occurs with the actuators or openings according to this invention, for example, when the aircraft or flight vehicle is flying at cruise conditions between about 4 degrees and about 6 degrees of an angle of attack.

The technology according to certain embodiments of this invention was tested on a 1:37 scale model in a subsonic wind tunnel. The yaw moment produced by the model with a 5-degree sideslip angle is shown in FIG. 4 by the purple, green, and blue lines for angles of attack ranging from −4 degrees to +26 degrees. The control effectors must be able to produce larger amounts of a yaw moment to maintain directional control. The red and black lines in FIG. 4 show that the control authority of the pneumatic yaw control actuators is more than sufficient to maintain directional control.

BRIEF DESCRIPTION OF THE DRAWINGS

The technical features of different embodiments of this invention are better understood when this specification is taken in view of the drawings, wherein.

DETAILED DESCRIPTION OF THE INVENTION

According to some embodiments of this invention, active flow control experiments were conducted on a UCAV model that is a hybrid of the ICE-101 planform and the SACCON profiles. The experiments were done at the USAFA Subsonic Wind Tunnel.

In some embodiments of this invention, surface blowing actuators are designed for apex, midspan, and trailing edges of a vehicle, according to this invention. As used throughout this specification and in the claims, the terms actuator, opening, slot, blowing actuator, blowing air opening, control slot, actuator slot and/or control surfaces are intended to describe similar structural features, relate to each other and/or be interchangeable with each other. The trailing-edge actuator slots were too thin to be constructed or built correctly by the SLA process, so these were epoxied over or reworked with epoxy materials. Only the apex and the midspan actuators were used during the tests. Measurements of lift, drag, pitch, roll, and yaw were obtained at Mach numbers between M=0.15 and M=0.4. Sideslip angles of beta=−10, 5, and −5 degrees were used. In some embodiments of this invention, data presented are limited to Mach number M=0.2.

Figure 1:
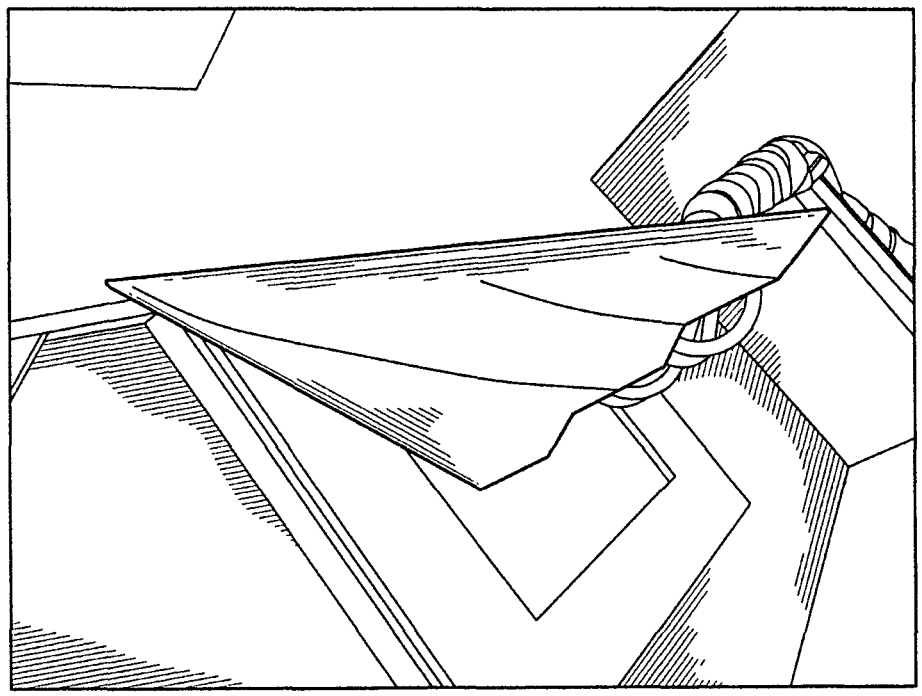
FIG. 1 is a perspective view of a flight vehicle, according to one embodiment of this invention.

FIG. 1 shows a Hybrid ICE-101 Saccon model in USAFA Subsonic Wind tunnel, according to one windtunnel test of this invention. As shown in FIG. 1, the flow is from left to right. Backlighting highlights the air supply tubing, and the outline of the model. FIG. 1 shows the actuator slots at the apex and the trailing edge.

Figure 2:
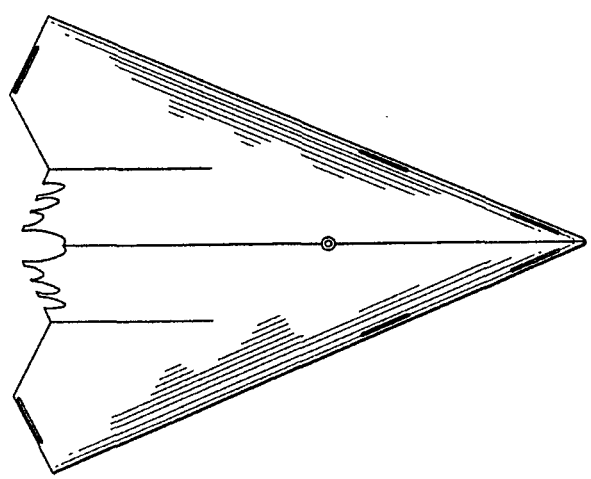
FIG. 2 is a plan view of the flight vehicle, as shown in FIG. 1.

FIG. 2 shows a plan view of the model which is similar to the ICE-101, according to one embodiment of this invention. Control slots at or near the apex, the midspan and the trailing edge is shown in FIG. 2. In some embodiments of this invention, the model can be constructed, for example, at USAFA using the SLA process. The top surface of the trailing edge control slots was too thin to be built properly, so these control surfaces were epoxied over or reworked with epoxy materials.

Reference Area, S=73.2 in^2

MAC=8.5 in.

b=11.3 in.

Moment x shift is −2 in relative to the balance center point.

The moment reference point is 5.602 in from the nose.

Figure 3:
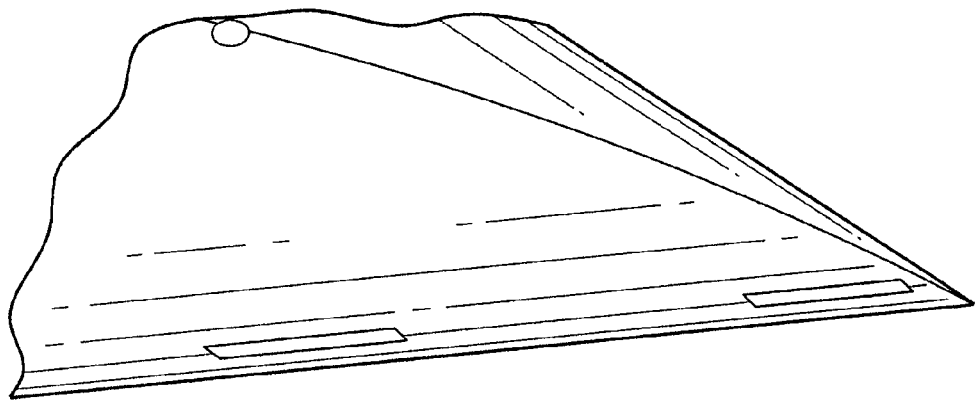
FIG. 3 is an enlarged perspective view of an apex section and a midspan section showing openings or actuators, according to one embodiment of this invention.

FIG. 3 shows a close-up or enlarged view of starboard side apex and midspan control slots, according to some embodiments of this invention. In some embodiments of this invention, flow exits tangentially to the surface of the wing. In some embodiments of this invention, the actuator slot dimensions can be 1.16 in×0.018 in (29.5 mm×0.46 mm), for example.

According to some embodiments of this invention, a "Flow Control Unit" (FCU) as shown was used to control the air flow rates to the actuator slots. According to some embodiments of this invention, the FCU can be built to control all three pairs of actuators, and can include a bank of line pressure regulators, three pneumatic directional control valves, an internal power supply, needle valves on all 6 exit lines, preferably but not necessarily one for each actuator, and 6 pressure sensors, preferably but not necessarily one for each actuator.

Figure 4:
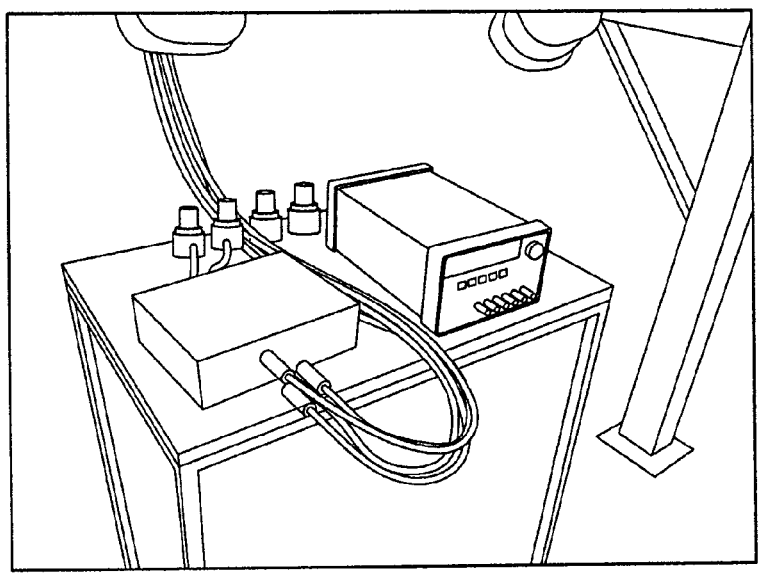
FIG. 4 is a view of a flow control unit, according to one embodiment of this invention.

FIG. 4 shows one embodiment according to this invention of a Flow Control Unit that controls air flow to the actuator slots.

Baseline Lift, Drag, and Pitching Moment—No Flow Control

Figure 5:
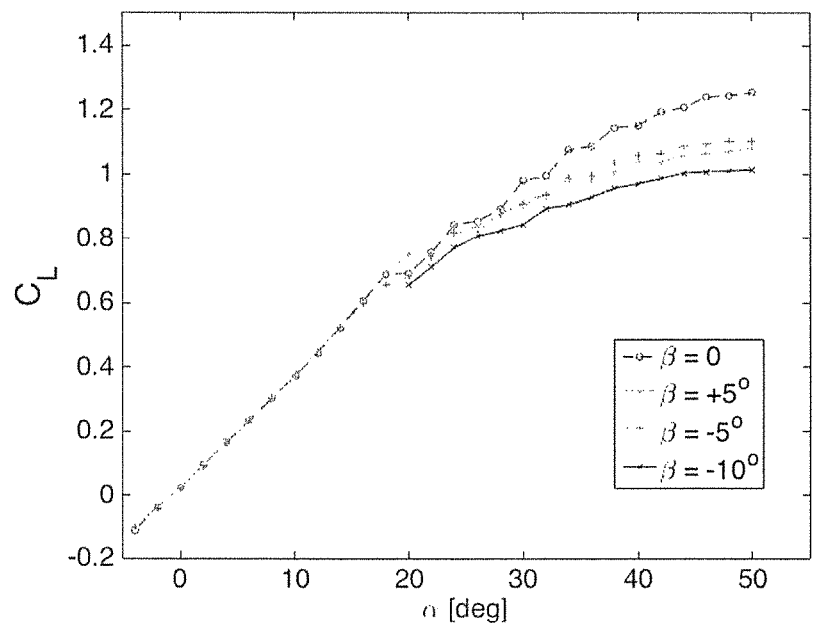
FIGS. 5-16 each shows a different graph with different data, according to some embodiments of this invention.

FIG. 5 shows a lift coefficient without actuation, according to one embodiment of this invention.

Figure 6:
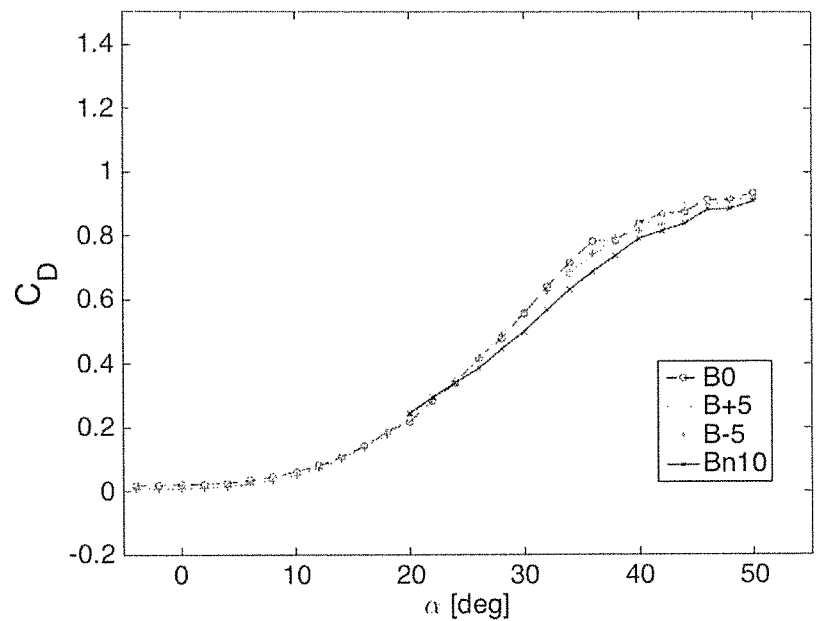

FIG. 6 shows a drag coefficient without actuation, according to one embodiment of this invention.

Figure 7:
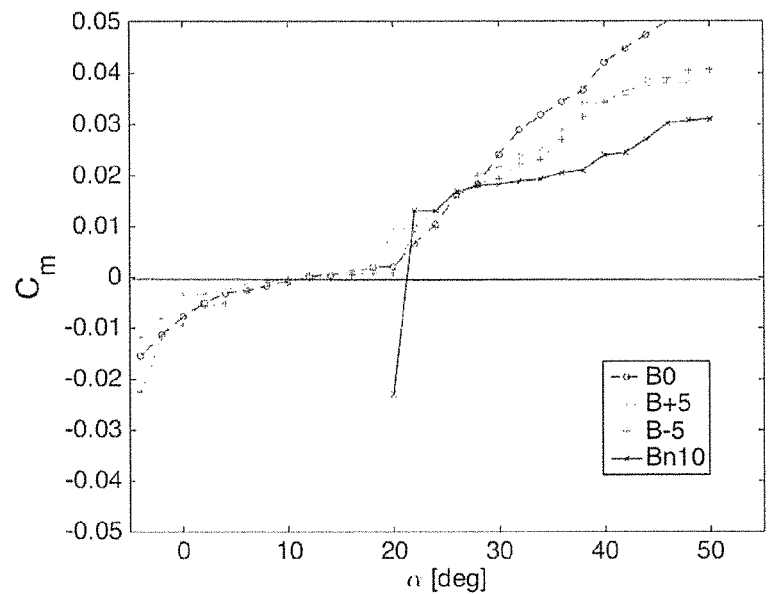

FIG. 7 shows a pitching moment without actuation, according to one embodiment of this invention.

This model according to this invention has a different pitch behavior than either the ICE-101 or the Saccon model. The Saccon model has a strange strong pitch moment reversal near alpha=17 deg, which is the same location that it reaches its maximum lift coefficient. There is one obviously bad data point for the Bn10 data at alpha=20 deg.

Lift, Drag, and Pitching Moment—With Flow Control

Figure 8:
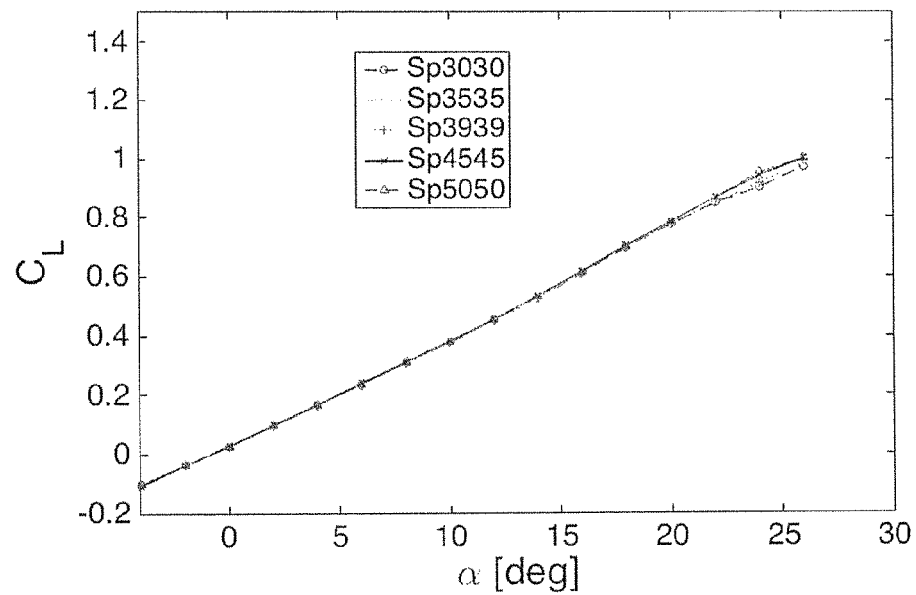
Figure 9:
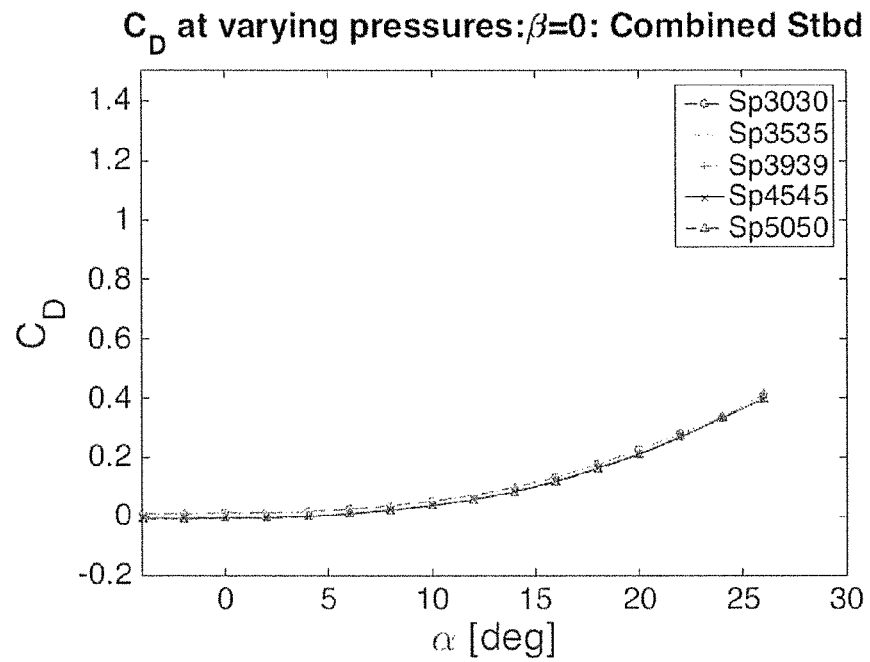
Figure 10:
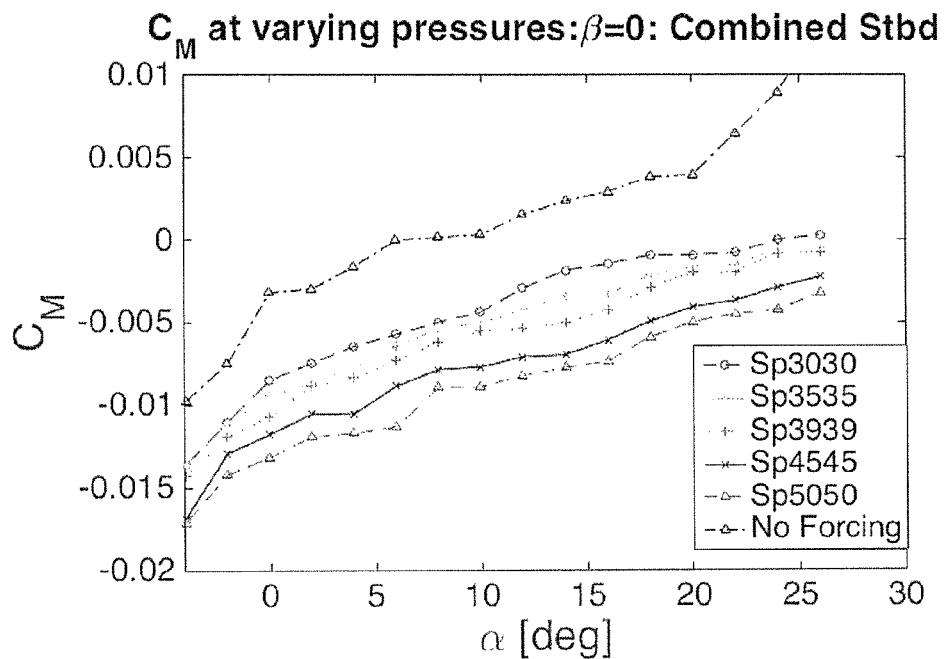

In some embodiments according to this invention, the effects of actuation on lift, drag, and pitching moment coefficients, according to this invention, are shown in FIGS. 8-10. As used throughout this specification and in the claims, nomenclature includes: SpXXYY=starboard port, Apex actuator amplitude (10× Volts), Midspan actuator amplitude (10× Volts), e.g. Sp3030=actuation from both the starboard side apex and midspan actuators at 3.0 volts pressure, for example.

As discussed in the specification there is a calibration of the actuator pressure to flow rate and Cmu, according to some embodiments of this invention.

FIG. 8 shows a lift coefficient variation with actuation, according to some embodiments of this invention.

FIG. 9 shows lift and drag coefficients, according to some embodiments of this invention, measured in the low angle of attack range −4 deg <alpha <26 deg are shown for different supply pressures. There is little influence of the actuation on the lift and drag coefficients.

FIG. 10 shows a moment dependence on starboard side actuation, according to some embodiments of this invention.

The pitching moment can be influenced by actuation, for example. FIG. 10 shows, according to this invention, that an increased nose-down pitching moment occurs with starboard side actuation. The effect increases with increasing pressure to the actuators.

Roll Control

Figure 11:
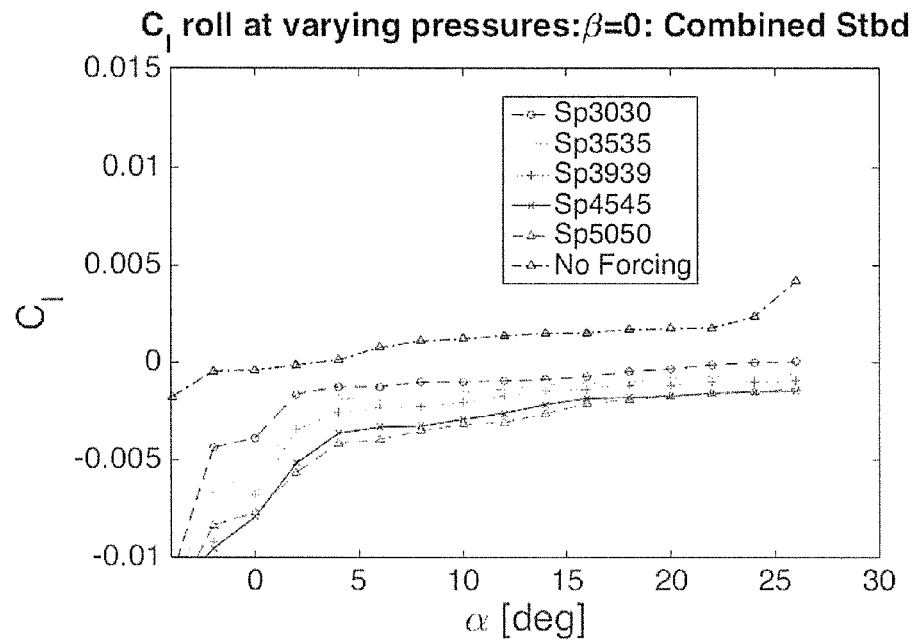

FIG. 11 shows a combined apex and midspan actuation effect on roll control, according to some embodiments of this invention.

According to this invention, the effect of starboard side actuation from both the apex and midspan slots on the roll moment coefficient is shown in FIG. 11. A negative roll moment corresponds to right wing up. There is not much roll control authority from the combination of the actuator in the low angle of attack range. At alpha=20 deg the starboard side forcing produces a weak negative roll moment less than Cl=−0.005. However, there appears to be substantial roll control at negative angles of attack. This would suggest, according to this invention, locating control slots on the pressure side of the wing may be very beneficial for roll control.

Figure 12:
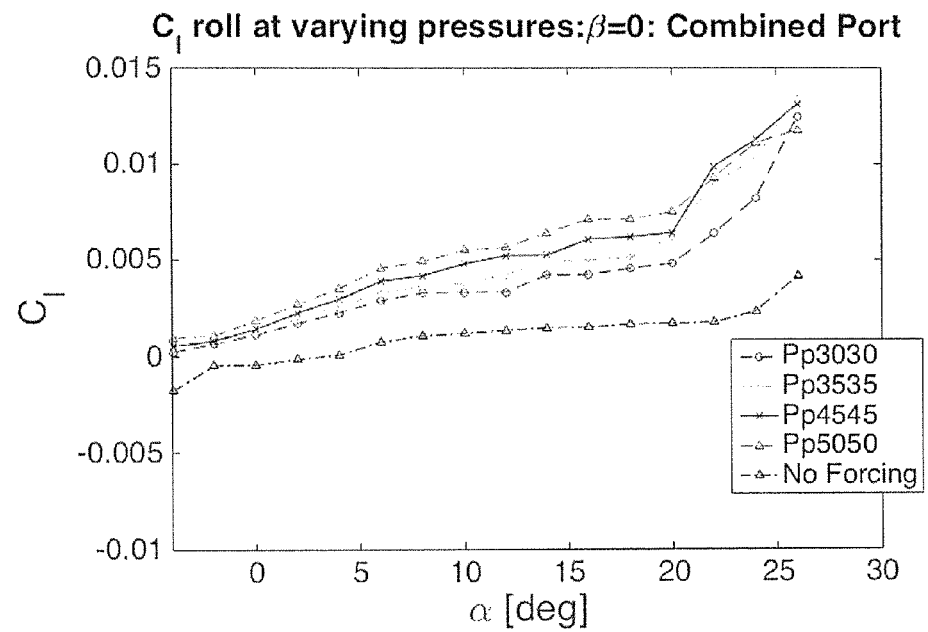

FIG. 12 shows a port side actuation with both actuators, for example, for an effect on roll control, according to some embodiments of this invention.

Forcing from the port side produces positive, which relates to right wing down, roll moments. However, in some embodiments of this invention, the strong effect on roll at negative angles of attack seen with starboard side actuation is not present in this data set, according to this invention.

Yaw Control

Figure 13:
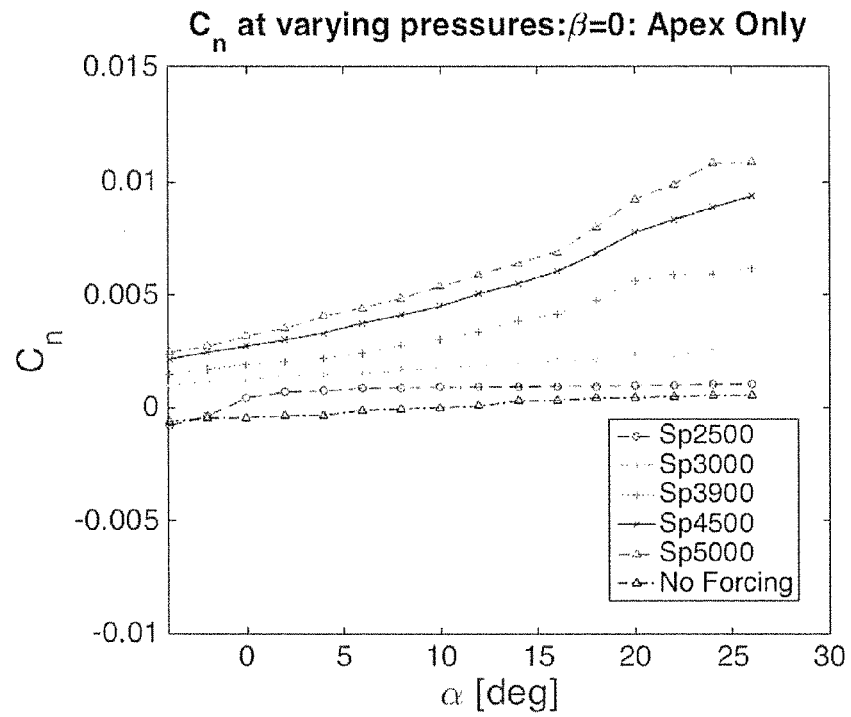

FIG. 13 shows an apex only forcing effect on yaw moment, such as at Mach number M=0.2, according to some embodiments of this invention.

According to this invention, the starboard side actuator at the apex or nose of the model is capable of producing a positive, which relates to a nose to the right, yaw moment, for example as shown in FIG. 13. In some embodiments of this invention, the effect becomes stronger as the angle of attack increases. At 20 degrees angle of attack the yaw moment produced is larger than the corresponding roll moment.

Figure 14:
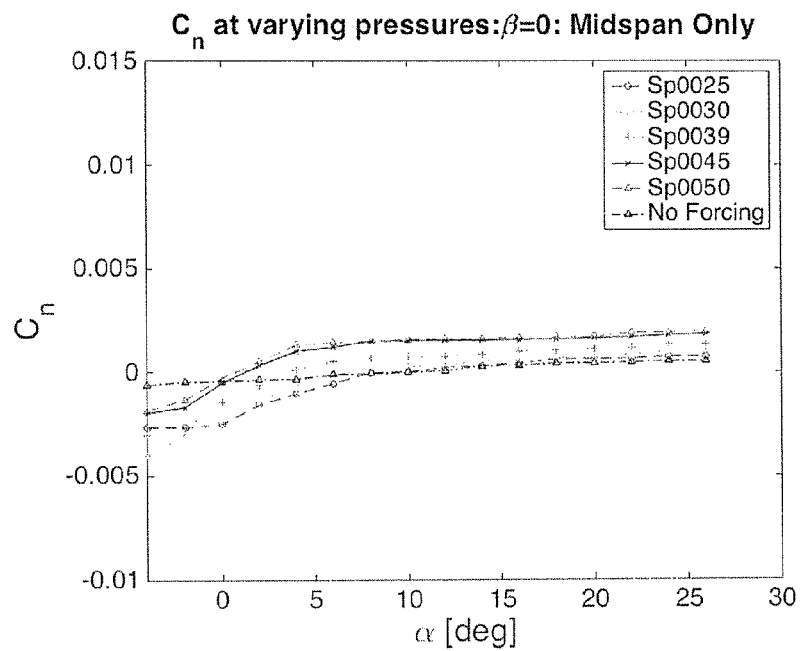

FIG. 14 shows a yaw moment dependence on midspan actuation, according to some embodiments of this invention.

According to some embodiments of this invention, in contrast to apex control, the midspan actuators have only a small influence on the yaw moment, at least in this low range of alpha. According to some embodiments of this invention, the yaw moment arm for the midspan actuator relative to the moment reference point is smaller than for the apex actuator, which may explain the smaller effect on yaw.

Figure 15:
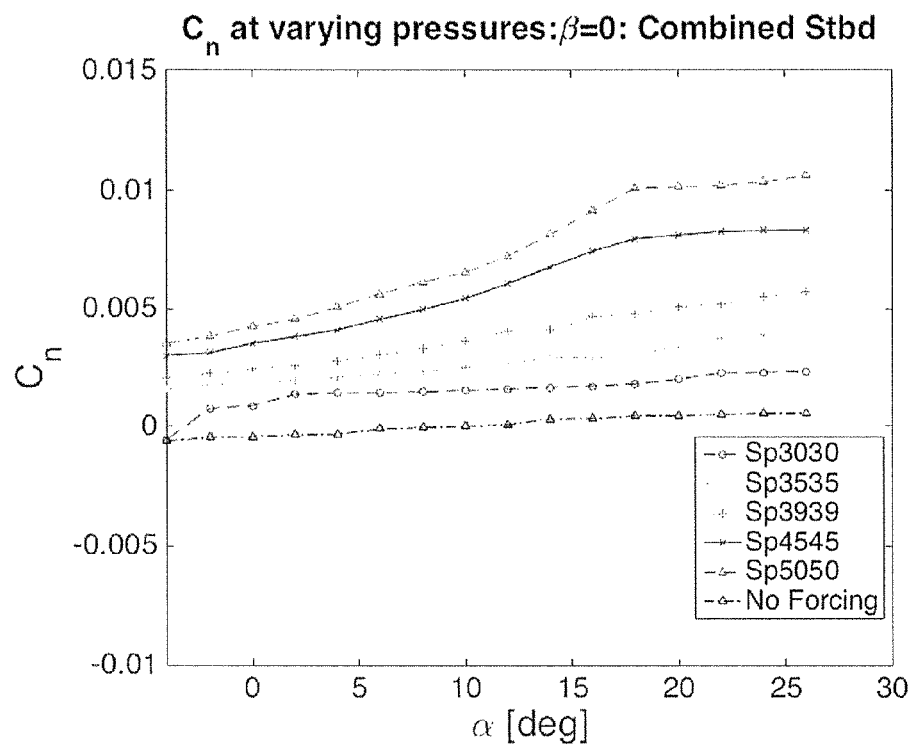

FIG. 15 shows an apex and midspan actuation effect on yaw moment, with Mach number at M=0.2, according to some embodiments of this invention.

According to some embodiments of this invention, a combination of apex and midspan actuation from the starboard side produces a positive yaw moment, for example, the nose turns to the right, which is in the direction of actuation. In some embodiments according to this invention, unlike the roll moment, the yaw moment does not appear to be saturating as the actuator amplitude is increased. As observed with the 'apex only' forcing, the yaw moment control is becoming more effective with increasing angle of attack.

Figure 22:
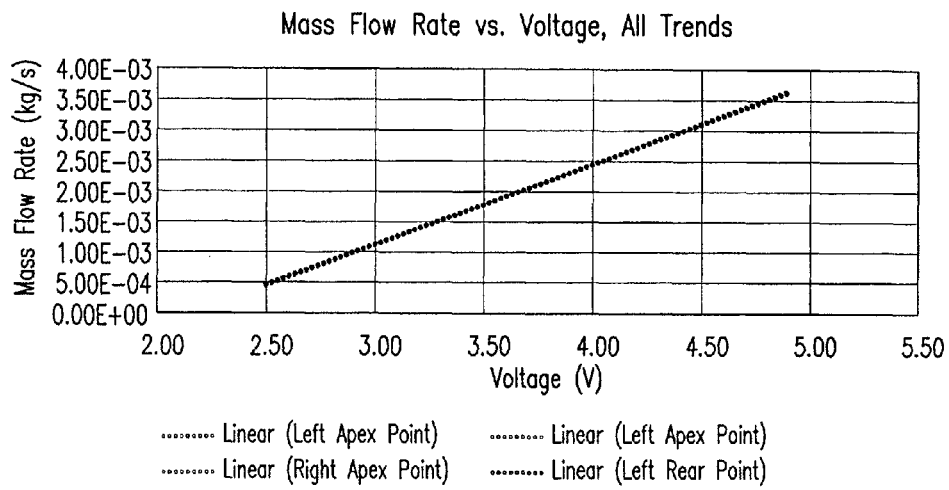
FIG. 22 shows a graph of mass flow rate vs. voltage, all trends, according to one embodiment of this invention.
Figure 23:
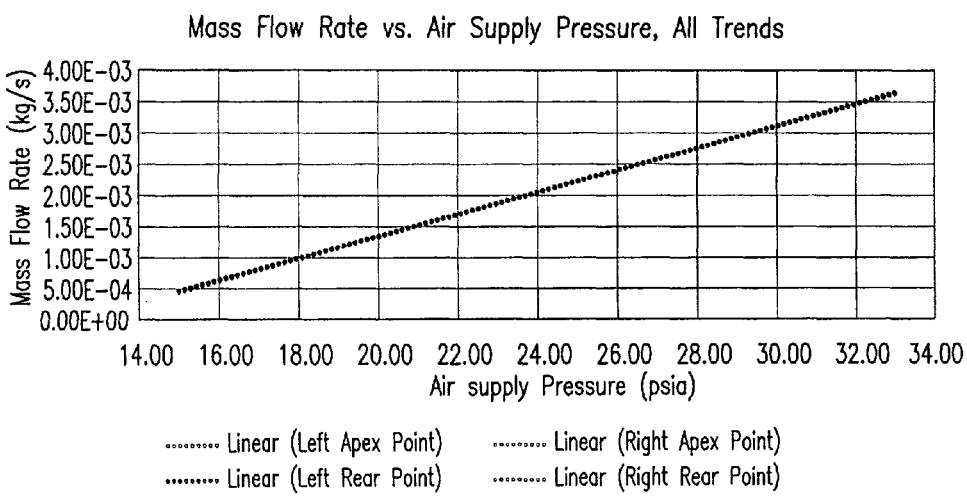
FIG. 23 shows a graph of mass flow rate vs. air supply pressure, all trends, according to one embodiment of this invention.

For comparison to the technical features of this invention, the Saccon yaw moments reported by Schutte, et al. (AIAA 2014-2132) in their FIGS. 22 and 23 showed that the yaw moment is Cn~0.012 at alpha=17 deg with trailing edge flap deflections on both sides (LOBLIB (−20 deg) and LIBROB (+20 deg)). Therefore, the yaw moment produced by the apex actuation in the current model of this invention is comparable to the fully deflected flaps on the Saccon model.

It is possible, according to some embodiments of this invention, that the flow from the apex actuator creates a low pressure in the nose region of the model, which is similar to a Coanda effect.

Although the data in FIG. 14 does not show it, according to some embodiments of this invention, at higher angles of attack (alpha >25 deg) the midspan actuation produced an opposite yaw effect than apex forcing, i.e., when a negative yaw moment occurred with the apex forcing then a positive yaw moment would be produced with midspan forcing. According to some embodiments of this invention, this led to trying "cross actuator" forcing. With cross-forcing the starboard apex actuator was paired with the port midspan actuator. At high angles of attack the net yaw moment would be doubled. It is possible to include this data. According to this invention, the same cross forcing technique was used at lower angles of attack. Some results are shown in FIG. 16.

Figure 16:
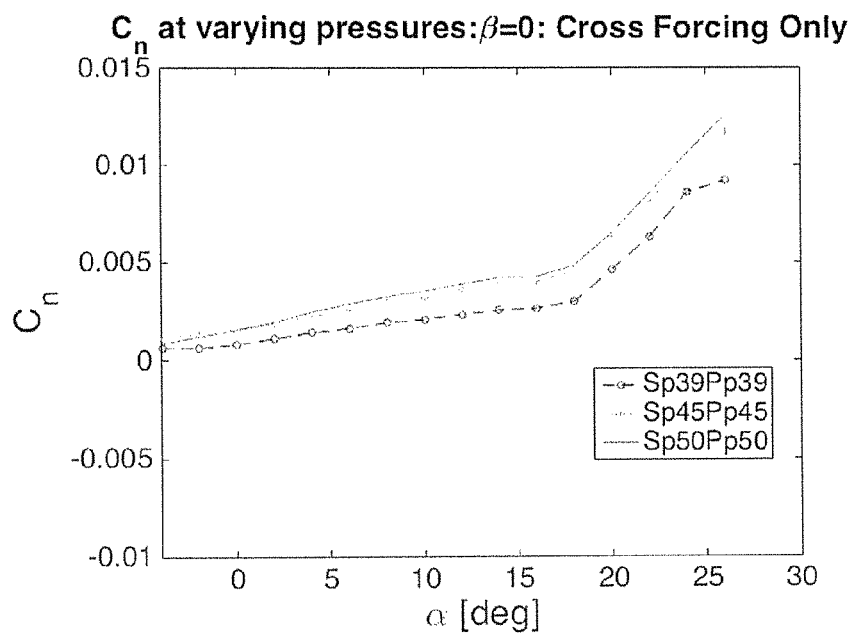

FIG. 16 shows a cross forcing actuation (starboard apex, port midspan) influence on yaw moment, according to some embodiments of this invention.

Observations

Only the low angle of attack data obtained at Mach number M=0.2 is presented in this specification. High angle of attack data and data at different Mach numbers and sideslip angles can be presented according to other embodiments of this invention.

According to some embodiments of this invention, the apex and midspan actuators appear to have negligible effect on lift and drag coefficients, but they produce a more negative pitching moment with increasing amplitude.

According to some embodiments of this invention, the apex actuators appear to be promising for yaw control. Magnitudes of yaw coefficient comparable to those obtained with fully deflected trailing edge flaps on the Saccon model were obtained, according to some embodiments of this invention.

According to some embodiments of this invention, evidence for the possibility of roll control using actuation on the pressure side of the wing is shown in FIG. 11, although the results were not conclusive, because port side actuation did not show a similar effect.

A different model, according to some embodiments of this invention, could be built for experiments. The different model of this invention could have a slightly thicker trailing edge to allow for the trailing edge actuators to be built. The different model of this invention could include both pressure and suction side actuators at the apex of the wing to test the possibility of enhance roll control.

Some simulations according to some embodiments of this invention will provide more insight, and perhaps even confirmation, that the surface pressures in the vicinity of or near the actuators are lowered. The influence of actuation on the vortex structures may also become clearer from the numerical simulations which could help optimize the location of the actuators.

The following table represents data from simulations, according to this invention.

| Run   | CLIFT    | CDRAG    | CPITCH    | CROLL     | CYAW      |
|-------|----------|----------|-----------|-----------|-----------|
| run00 | 0.743720 | 0.217892 | −0.171369 | −0.000000 | 0.000000  |
| run01 | 0.747458 | 0.210004 | −0.172045 | 0.000798  | −0.001692 |
| run02 | 0.734455 | 0.204759 | −0.168550 | −0.000655 | 0.001268  |
| run03 | 0.747457 | 0.210004 | −0.172044 | −0.000797 | 0.001693  |
| run04 | 0.734450 | 0.204760 | −0.168550 | 0.000657  | −0.001266 |

In some embodiments according to this invention, although the moment center is specified at a balance center, according to this invention, the output of the CFD code did not reflect that aspect. According to some embodiments of this invention, it is possible to understand the reference point which most likely is the nose of the model or the origin of the coordinate system, which will require the moments to be recomputed however, roll should not change. In some embodiments of this invention, it is possible to use flow visualization data to verify mass flow, but the input velocity could cause forcing to be applied at mdot=10 g/s, for example, using the following explanation.

AoA=20 deg, M=0.2
Run00: unforced
Run01: Starboard apex forcing
Run02: Starboard midspan
Run03: Port apex
Run04: Port midspan In view of the above explanation, in some embodiments of this invention, CL is a little higher than the measurements, but reasonable considering the mesh quality, CD is a little lower than the measurements, but reasonable, and roll and yaw moment coefficients change signs between apex and midspan forcing.

Measuring Mass Flow Rates Through UAV Control Points

According to some embodiments of this invention, four control points of the ICE-101/SACCON UAV hybrid are considered and/or tested to determine a calibration between supply pressure and mass flow rate through each of the four points. It is shown that performance between control points is relatively uniform, and data was collected over six trials for each of the four control points. A distribution of mass flow rates for all four control points with a confidence interval of 95% is obtained over a range of supply pressures. In some embodiments of this invention, the flow coefficients of the control points are considered.

Nomenclature $P_{actual}$=absolute line pressure (psia)
$V_{out}$=voltage read by pressure sensors (V)
$V_{actual}$=actual volume flow rate, adjusted for environment (m³/s)
$V_{standard}$=volume flow rate assuming ideal conditions, 100 psig, 70 degrees F.
$P_{standard}$=100 psig
Mf=Mass flow rate (kg/s)
Vf=Volume flow rate (SCFM)
Q=Volume flow rate (SCFM)
$N_2$=Constant in flow coefficient equations to account for unit changes, in this embodiment it is equal to 22.67
$C_v$=Flow coefficient (SCFM)
$G_g$=Specific gravity of a gas (for air, 1.0)
$T_1$=Upstream temperature in Rankine
ΔP=Pressure drop across a component (psia)

According to some embodiments of this invention, the Unmanned Aerial Vehicle (UAV) model used in this investigation is a hybrid flying wing design which utilizes circulation control wings (CCW) implementing the Coanda effect as the primary means of control. In some embodiments of this invention, the performance of these CCWs relies on the pressure of the air supply flow which runs through them. Observing and analyzing the mass flow rates through the CCWs on this model and determining their calibration with supply pressure is beneficial as a foundation for future testing of this UAV model. The effects of supply pressure on mass flow rate through each of the four CCWs on the aircraft are explored in this investigation.

The Innovative Control Effectors (ICE) research effort, funded jointly by the U.S. Air Force and U.S. Navy, began in the mid-90s with the objective of finding more efficient, elegant, and maneuverable control surfaces for flying wing aircraft that do not have vertical tails. Such aircraft typically have difficulty with yaw control, because they lack any sort of vertical control surface. The ICE effort's objective was essentially to create a flying wing aircraft without any vertical fins or surfaces that can still maintain F-16 class maneuverability. The model used in this study was designed based on one of the ICE configurations, ICE 101. The two designs have an identical profile and dimensions when viewed from the top. However, ICE 101 is a manned design, and the model according to this invention is specifically unmanned.

The North Atlantic Treaty Organization Science and Technology Organization/Applied Vehicle Technology (NATO STO/AVT) departments were interested in an UAV design with a similar goal as the ICE effort, a flying wing aircraft with no vertical control surfaces. They developed a generic UAV model for use in simulation and wind tunnels called the Stability and Control Configuration (SACCON). Many different configurations were spawned from the SACCON model. The DLR-F19 configuration is centrally of interest to this investigation, as the airfoil profiles of the UAV model of this invention are taken from this configuration.

Essentially, the UAV model being tested, according to some embodiments of this invention, is a hybrid of the SACCON UAV configuration and the ICE 101 configuration, which implements CCWs that apply the Coanda effect for improved control. Testing at the USAFA subsonic wind tunnel measured the air supply pressure, but not the flowrate.

Figure 19:
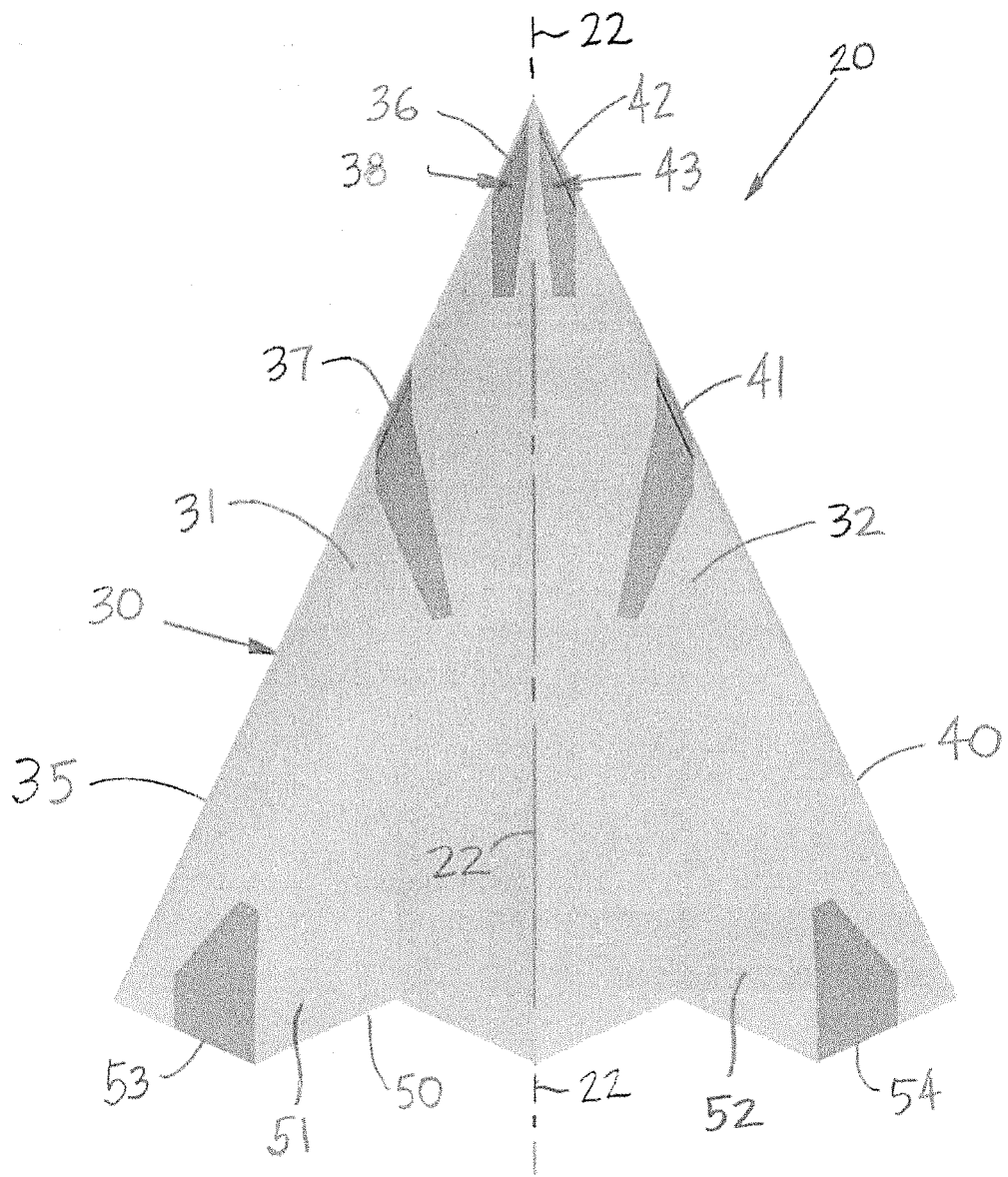
FIG. 19 shows a plan view of a flight vehicle, according to another embodiment of this invention.

FIG. 19 shows a schematic plan view of flight vehicle 20, which is tailless or has no tail and is also aileronless or has no aileron, according to some embodiments of this invention. In different embodiments of this invention, flight vehicle 20 can be tailless and/or aileronless, depending upon the particular desired flight characteristics of flight vehicle 20. Flight vehicle 20 can be any suitable manned or unmanned flight vehicle, aircraft and/or any other suitable flying structure. In some embodiments of this invention, flight vehicle 20 can be a vehicle that operates in the air, on the land and/or in the water. Some embodiments of this invention are directed to controlling a yaw moment of flight vehicle 20.

In some embodiments according to this invention, flight vehicle 20 comprises wing 30 having opposing wings sections 31 and 32. As shown in FIG. 19, centerline 22 divides wing 30 into section 31 and section 32, which in some embodiments, are positioned opposite from each other with respect to centerline 22. According to this invention, flight vehicle 20 can have any other suitably shaped or designed wing 30. For example, as shown in FIG. 19, trailing side 50 can comprise section 51 and section 52, which can have the shape shown or any other suitable shape or design, particularly which accommodates the desired flight characteristics of flight vehicle 20.

As shown in FIG. 19, side 35 of wing 30 has opening 36 positioned at or near apex section 38 of side 35, according to some embodiments of this invention. Also as shown in FIG. 19, side 40 of wing 30 has opening 41 positioned at a distance from apex section 43 of side 40, according to some embodiments of this invention. In some embodiments of this invention, a precise or particular size, shape, location and/or position of opening 36 and/or opening 41 can be varied and selected depending up on the particular flight performance requirements of wing 30 and thus flight characteristics of flight vehicle 20.

As shown in FIG. 19, side 40 of wing 30 has opening 42 positioned at or near apex section 43 of side 40, according to some embodiments of this invention. Also as shown in FIG. 19, side 35 of wing 30 has opening 37 positioned at a distance from apex section 38 of side 35, according to some embodiments of this invention. In some embodiments of this invention, a precise or particular size, shape, location and/or position of opening 37 and/or opening 42 can be varied and selected depending up on the particular flight performance requirements of wing 30 and thus flight characteristics of flight vehicle 20.

Figure 20:
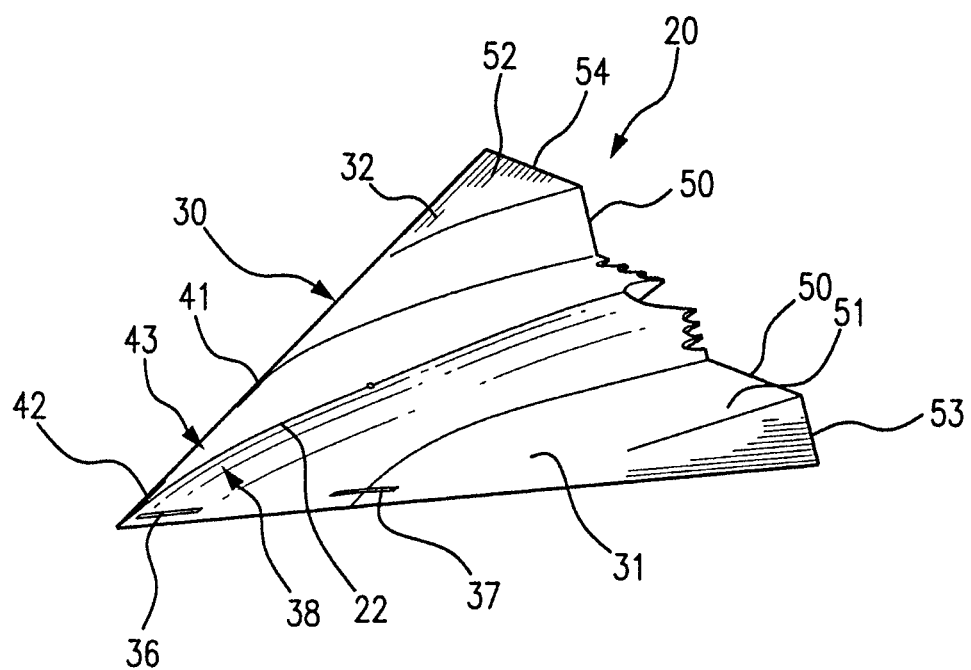
FIG. 20 shows a perspective front view of a flight vehicle, according to one embodiment of this invention.
Figure 21:
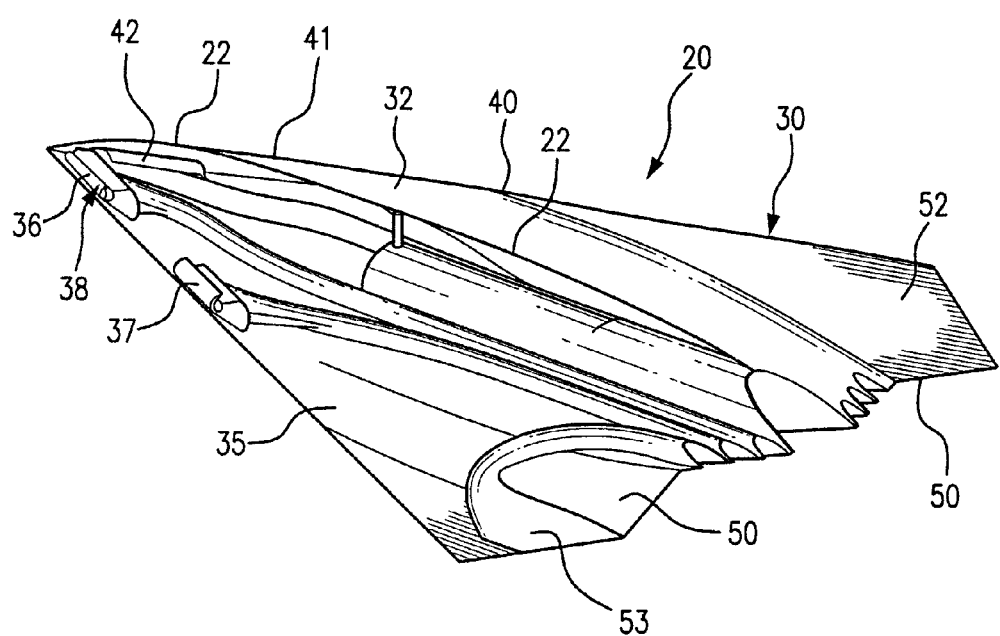
FIG. 21 shows a cutaway or partial sectional view of a flight vehicle, according to one embodiment of this invention.

FIGS. 20 and 21 show a top perspective view and a partial cutaway perspective view, of flight vehicle 20 according to another embodiment of this invention. FIG. 20 shows a different view of centerline 22 and FIG. 21 shows a cutaway of an external surface of side 31 removed partially along centerline 22, to show some internal components of flight vehicle 20, according to certain embodiments of this invention.

FIGS. 19-21 show different embodiments of flight vehicle 20, each having two openings 36 and 37 on one side 31 and each having two openings 41 and 42 on side 32 which is opposite of centerline 22 with respect to side 31. In other embodiments of this invention, not shown in the drawings, side 31 can have one or more additional openings in addition to openings 36 and 37, and/or side 32 can have one or more additional openings in addition to openings 41 and 42. In some embodiments of this invention, the additional openings can be positioned, for example, between openings 36 and 37 and/or between openings 41 and 42. In other embodiments of this invention, the additional openings can be positioned, for example, downstream and/or upstream with respect to openings 36 and 37 and/or with respect to openings 41 and 42.

In some embodiments according to this invention, a pressure supply device forms communication between a fluid supply and opening 36 and opening 41, for example, to pass a first portion of a fluid from the fluid supply to opening 36 and to pass a second portion of the fluid from the fluid supply to opening 41. In some embodiments of this invention, simultaneously supplying fluid to opening 36 and opening 41, with or without supplying fluid to opening 37 and opening 42, turns, rotates or otherwise suitably moves wing 30 and thus flight vehicle 20, for example, in a first direction. In some embodiments of this invention, fluidic flow characteristics of the fluid flow can be varied or changed to provide or result in a different yaw moment and/or other flight characteristic of flight vehicle 20.

In some embodiments according to this invention, a pressure supply device forms communication between the fluid supply and opening 37 and opening 42, for example, to pass a third portion of the fluid from the fluid supply to opening 42 and to pass a fourth portion of the fluid from the fluid supply to opening 37. In some embodiments of this invention, simultaneously supplying fluid to opening 37 and opening 42, with or without supplying fluid to opening 36 and opening 41, turns, rotates or otherwise suitably moves wing 30 and thus flight vehicle 20, for example, in a second direction, which in some embodiments of this invention is different than the first direction. In some embodiments of this invention, fluidic flow characteristics of the fluid flow can be varied or changed to provide or result in a different yaw moment and/or other flight characteristics of flight vehicle 20.

In some embodiments according to this invention, flight vehicle 20 comprises a fluid control device for controlling a volume flow or other volumetric flow rate from the fluid supply to any one or more of the combination of opening 36, opening 37, opening 41 and/or opening 42. In some embodiments of this invention, the fluid control device comprises a controller that receives one or more signals from input devices, such as at least one sensor sensing at least one input parameter, for example corresponding to or associated with flight vehicle 20 and/or wing 30, and each sensor communicating a sensed signal to the controller or another suitable control device. The fluid control device can emit signals or otherwise communicate signal information to vary or change any suitable flow parameters, such as a volume flow of the fluid to any one or more of the combination of opening 36, opening 37, opening 41 and/or opening 42.

According to some embodiments of this invention, such as shown in FIG. 19, trailing side 50 comprises section 51 of side 35 of wing 30 having opening 53 and section 52 of side 40 of wing 30 having opening 54. In some embodiments of this invention, the pressure supply device forms communication between the fluid supply and opening 53 and opening 54. The control device can use the controller that receives one or more signals from the input devices to vary or change any suitable flow parameters, such as a volume flow of the fluid to any one or more of the combination of opening 53 and/or opening 54.

In some embodiments according to this invention, the pressure supply device simultaneously supplies and discharges the first portion of the fluid to the first opening, the second portion of the fluid to the second opening, the third portion of the fluid to the third opening, the fourth portion of the fluid to the fourth opening, the fifth portion of the fluid to the fifth opening and/or the sixth portion of the fluid to the sixth opening. In some embodiments of this invention, fluid discharged from any one or more of the openings is discharged upon or directed to an external surface of wing 30 and is known in the industry to be related to blowing air.

According to some embodiments of this invention, the pressure supply device at least in part, can be a power plant, such as a jet engine or another suitable engine or power supply device, preferably carried on board flight vehicle 20. Any other suitable pressure supply device can be used to accomplished results of providing pressurized fluid or another suitable force to move the fluid of this invention. In some embodiments of this invention, more than one power plant can be used to furnish the pressurized fluids as required.

According to some embodiments of this invention, flight vehicle 20 has no tail and thus is referred to as tailless, has no vertical stabilizer and thus is referred to as vertical stabilizerless, and/or has no rudder and thus is referred to as rudderless, and as used throughout this specification and in the claims, these respectively corresponding terms are intended to be interchangeable with each other. According to some embodiments of this invention, flight vehicle 20 has no aileron and thus is referred to as aileronless. As used throughout this specification and in the claims, these corresponding terms are intended to be interchangeable with each other.

In some embodiments according to this invention, a method for controlling a yaw moment of flight vehicle 20 includes passing a first portion of the fluid to opening 36 and passing a second portion of the fluid to opening 41, particularly wherein opening 36 is within side 35 of section 31 that is opposite centerline 22 of or with respect to section 32 that has side 40 with opening 41. In some embodiments according to this invention, the method further includes passing a third portion of the fluid through opening 42 and passing a fourth portion of the fluid through opening 37. In some embodiments of this invention, the fluid is simultaneously passed to only openings 36 and 41 or only openings 37 and 42, while in other embodiments of this invention the fluid is simultaneously passed to openings 36, 37, 41 and 42.

In some embodiments of this invention, the method includes varying the volume flow of the first portion, the second portion, the third portion and/or the fourth portion of the fluid, any one or more of which can be used to alter, vary or change the yaw moment of flight vehicle 20.

In order to further study this model, according to some embodiments of this invention, a calibration between supply pressure to the control points, such as CCWs and mass flow rate through these control points must be obtained, which in some embodiments is accomplished with a known flowmeter.

According to some embodiments of this invention, the apparatus design for finding a mass flow rate calibration is described in this specification and the data for mass flow rate vs. pressure sensor voltage is presented in this specification, along with data conversions between types of flow that are necessary to find the aforementioned calibration. The accuracy and efficacy of this calibration is examined in section IV, along with an analysis of the flow coefficient for all four control points. Finally, the results are summarized in this specification.

The apparatus used in this experiment, according to some embodiments of this invention, is designed to measure supply pressure to the actuators on the UAV model and their effect on the mass flow rate of the system. The primary instrument of measure for the flow rate is a known or commercial flowmeter connected in series with the supply flow line.

Figure 17:
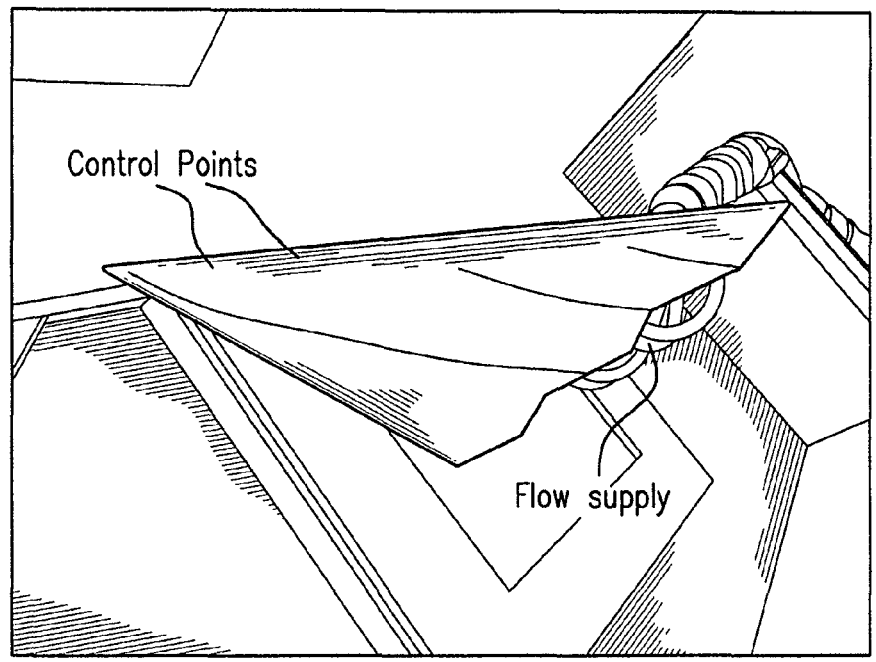
FIG. 17 shows a perspective view of a flight vehicle, according to one embodiment of this invention.

According to some embodiments of this invention, the UAV model shown in FIG. 17 has four control points, and each must be tested for performance. Controlled flow is blown through each control point separately at pressures ranging from 14.7 psia to 61.7 psia. The mass flow rate is obtained at each pressure value across this range. According to some embodiments of this invention, there is a calibration between supply pressure and mass flow rate for each of the four control points, and the flow coefficient is computed for each point.

FIG. 17 shows the UAV Model fixed to an arm in a wind tunnel with polyurethane tubing connected to the hose barbs for each control point, according to some embodiments of this invention. In some embodiments of this invention, flow moves from the barbs through plumbing in the body to each of the four control points across the leading edge of the craft.

Figure 18:
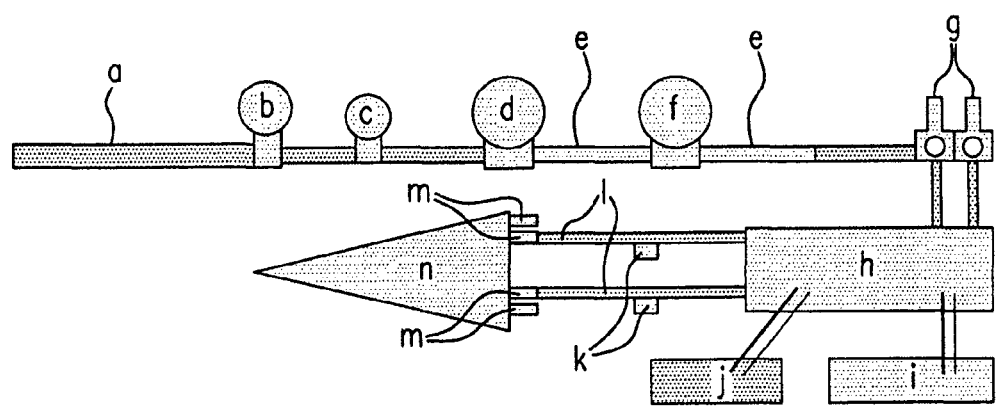
FIG. 18 shows a diagrammatic view of an apparatus and method, according to some embodiments of this invention.

The apparatus designed for testing these control points is shown in FIG. 18.

FIG. 18 shows one embodiment of a diagrammatic view of an apparatus according to some embodiments of this invention. In some embodiments, supply pressure is maintained at 47 psig through all tests in this investigation, the lab temperature surrounding this apparatus is maintained at 295.8±0.6 degrees kelvin. Some elements of this invention are labelled with letters.

a) Lab supply hose; lab supply pressure ~200 psig
b) Speedaire ¾" air line regulator
c) Generic pressure gauge
d) Flowmeter—Orange Research 2221-S1019; range of 1.5-10 Standard Cubic Feet per Minute at 100 psig and 70° F. (SCFM)
e) 6" pipe nipples
f) Flowmeter—Orange Research 2221-S1017; range of 3-25 SCFM
g) Festo LRB-D-Mini regulators
h) ¼ inch brass needle valve with a Cv=0.43
i) Variable power supply—HP E3620A
j) Multimeter—Agilent 34401A
k) Pressure sensors
l) ¼" Polyurethane tubing
m) UAV Model hose barbs. One barb for each control point; the inside two barbs correspond to the apex control points, the outside two barbs correspond to the rear control points. Port and starboard barbs correspond to their respective sides.
n) UAV Model According to some embodiments of this invention, all references in the following description pertain to components shown in FIG. 18. Flow in the apparatus originates from the lab air supply (a), which supplies flow at a pressure of approximately 200 psig. The regulator (b) decreases the supply pressure from ~200 psig to a constant 47 psig. The pressure gauge (c) confirms this pressure drop. There are two flowmeters connected in series (d, f). The two flowmeters have ranges which complement each other. This way, the two meters can be checked against each other for accuracy, and volume flow rate is measured across a range of 1.5-25 SCFM. In some embodiments of this invention, the 6" pipe nipples (e) are used to create a rigid line of flow 6" upstream and downstream of the flowmeters to ensure accurate readings. The current flows into two connected regulators (g), which split the flow into two separate lines. The line is split to lead to either the port or starboard control points. These two lines lead into a needle valve regulator (h) which is used to finely adjust supply pressure so that it can be accurately measured and adjusted as the independent variable of the experiment. The needle valve regulator is powered by a 5V DC power supply (i). The two pressure sensors (k) connect back to the needle valve regulator. The regulator returns a voltage based on the pressure that the sensors are reading. This voltage is then read by a multimeter (j). There is a calibration between the supply voltage, 5V, the pressure in the line, and the voltage read on the multimeter. The polyurethane tubing (l) leads from the needle valve regulator to two of four hose barbs (m) on the model. Each barb corresponds to a different control point that must be individually tested. The air flows through the plumbing in the UAV model (n) and out the control points.

According to some embodiments of this invention, data collection is designed to minimize any factors that may cause a change in flow rate from trial to trial. For each of the four control points, six trials are conducted. Each trial includes eleven data points. The independent variable is the voltage read from the pressure sensors, which is increased at increments of 0.25 V per data point, starting at 2.50 V, and ending at 4.90 V. The last data point is at 4.90 V because the supply line pressure sensor saturates at 4.93 V, at which point no further increase in pressure or flow rate can be detected.

According to some embodiments of this invention, testing of control points is staggered to assure that lab conditions are not influencing the results. For each of the four control points, two trials are conducted each day for three days. This way, the lab temperature can vary across the three days but it will not cause the results from one control point to be changed too much relative to another. With this procedure, 264 data points are collected over a three day period.

According to some embodiments of this invention, data was collected over a three day period. Each of the four control points was tested over six trials, each with eleven supply pressures. The supply pressures were determined from a calibration of the voltage reading of the pressure sensors in the supply line, so the voltage was used as the controlled independent variable of the experiment.

| V out | P actual (psia) | Flow rate on meter (SCFM) | St. dev | Mean un-certainty | Flow rate (converted) m3/s | mass flow rate (kg/s) | flow co-efficient (Cv) |
|---|---|---|---|---|---|---|---|
| 2.50 | 15.00 | 1.00 | 0.00 | 0% | 0.000254 | 3.11E-04 | 0.2609 |
| 2.75 | 16.88 | 2.08 | 0.17 | 18% | 0.000529 | 6.48E-04 | 0.2054 |
| 3.00 | 18.75 | 3.68 | 0.32 | 34% | 0.000935 | 1.15E-03 | 0.2697 |
| 3.25 | 20.63 | 5.18 | 0.12 | 13% | 0.001316 | 1.61E-03 | 0.3167 |
| 3.50 | 22.50 | 6.20 | 0.22 | 23% | 0.001574 | 1.93E-03 | 0.3324 |
| 3.75 | 24.38 | 7.13 | 0.17 | 18% | 0.001811 | 2.22E-03 | 0.3449 |
| 4.00 | 26.25 | 8.13 | 0.31 | 33% | 0.002065 | 2.53E-03 | 0.3610 |
| 4.25 | 28.13 | 8.95 | 0.16 | 17% | 0.002272 | 2.78E-03 | 0.3689 |
| 4.50 | 30.00 | 9.93 | 0.14 | 14% | 0.002522 | 3.09E-03 | 0.3840 |
| 4.75 | 31.88 | 10.77 | 0.15 | 16% | 0.002734 | 3.35E-03 | 0.3918 |
| 4.90 | 33.00 | 11.35 | 0.15 | 16% | 0.002882 | 3.53E-03 | 0.3989 |

Table 1 shows data from the left apex control point, according to some embodiments of this invention. All values on this table are the arithmetic mean of the respective values from all six trials; condensed into one table for clarity.

According to some embodiments of this invention, the voltage was increased by increments of 0.25 V, starting at 2.50 V, and ending at 4.90 V instead of 5.00 V because the pressure in the line saturated at an upper limit of 4.93 V. The voltage and pressure in the line are related by a calibration of supply voltage (5 V), voltage returned by the pressure sensors (the first column in Table 1), and actual pressure in the line (the second column in Table 1). The calibration used in this experiment, according to some embodiments of this invention, is shown in FIG. 4.

$$P_{actual} = V_{out} * 7.5 - 3.75 \qquad \text{eqn. (1)}$$

According to some embodiments of this invention, the calibration used to determine supply line pressure ($P_{actual}$), equation 1, is based on voltage returned by the pressure sensors ($V_{out}$). $V_{out}$ units-volts, $P_{actual}$ units-psia.

| V out | P actual (psia) | Flow rate on meter (SCFM) | St. dev | Mean un-certainty | Flow rate (converted) m3/s | mass flow rate (kg/s) | flow co-efficient (Cv) |
|---|---|---|---|---|---|---|---|
| 2.50 | 15.00 | 0.87 | 0.20 | 21% | 0.000220 | 2.70E-04 | 0.2261 |
| 2.75 | 16.88 | 2.35 | 0.21 | 22% | 0.000597 | 7.31E-04 | 0.2317 |
| 3.00 | 18.75 | 3.65 | 0.63 | 67% | 0.000927 | 1.14E-03 | 0.2672 |
| 3.25 | 20.63 | 5.47 | 0.44 | 46% | 0.001388 | 1.70E-03 | 0.3340 |
| 3.50 | 22.50 | 6.23 | 0.29 | 30% | 0.001583 | 1.94E-03 | 0.3342 |
| 3.75 | 24.38 | 7.23 | 0.44 | 46% | 0.001837 | 2.25E-03 | 0.3498 |
| 4.00 | 26.25 | 8.22 | 0.41 | 43% | 0.002086 | 2.56E-03 | 0.3647 |
| 4.25 | 28.13 | 9.07 | 0.18 | 19% | 0.002302 | 2.82E-03 | 0.3737 |
| 4.50 | 30.00 | 9.95 | 0.15 | 16% | 0.002526 | 3.09E-03 | 0.3847 |
| 4.75 | 31.88 | 10.83 | 0.17 | 18% | 0.002751 | 3.37E-03 | 0.3942 |
| 4.90 | 33.00 | 11.35 | 0.19 | 20% | 0.002882 | 3.53E-03 | 0.3989 |

Table 2 shows data from the right apex control point, according to some embodiments of this invention. All values on the table are the respective averages taken from all six trials.

According to some embodiments of this invention, the data collected was read off the two flowmeters (see FIG. 2 (d, f)). The directly collected data is located in the third column of Tables 1, 2, 3 and 4, in SCFM. However, this column assumes a standard environment of 100 psig at 70 degrees Fahrenheit. Since the lab conditions are significantly different, a conversion was performed on the collected data to obtain an accurate volume flow rate. The equation follows:

$$V_{actual} = \frac{P_{actual}}{P_{standard}} * V_{standard} * 0.000472 \qquad \text{eqn. (2)}$$

Equation 2, according to some embodiments of this invention, is based on the combined gas law, and relates the standard condition volume flowrate ($V_{standard}$) to the actual volume flowrate ($V_{actual}$) based on pressure in the environment $P_{actual}$. In some embodiments of this invention, this is then multiplied by a constant of 0.000472 to convert the units from SCFM to m³/s. For this experiment, according to some embodiments of this invention, $P_{actual}$ was relatively constant at 61.7 psia. Temperature variation from standard was not taken into account because it was not significant enough to influence results (±~0.4%).

| V out | P actual (psia) | Flow rate on meter (SCFM) | St. dev | Mean un-certainty | Flow rate (converted) m3/s | mass flow rate (kg/s) | flow co-efficient (Cv) |
|---|---|---|---|---|---|---|---|
| 2.50 | 15.00 | 0.88 | 0.26 | 27% | 0.000224 | 2.75E-04 | 0.2305 |
| 2.75 | 16.88 | 2.28 | 0.42 | 44% | 0.000580 | 7.10E-04 | 0.2252 |
| 3.00 | 18.75 | 3.48 | 0.54 | 56% | 0.000884 | 1.08E-03 | 0.2550 |
| 3.25 | 20.63 | 5.22 | 0.15 | 15% | 0.001325 | 1.62E-03 | 0.3188 |
| 3.50 | 22.50 | 6.15 | 0.21 | 22% | 0.001561 | 1.91E-03 | 0.3297 |
| 3.75 | 24.38 | 7.08 | 0.23 | 25% | 0.001798 | 2.20E-03 | 0.3425 |
| 4.00 | 26.25 | 8.10 | 0.24 | 25% | 0.002057 | 2.52E-03 | 0.3595 |
| 4.25 | 28.13 | 9.03 | 0.21 | 22% | 0.002294 | 2.81E-03 | 0.3724 |
| 4.50 | 30.00 | 9.90 | 0.10 | 10% | 0.002514 | 3.08E-03 | 0.3827 |
| 4.75 | 31.88 | 10.78 | 0.11 | 11% | 0.002738 | 3.35E-03 | 0.3924 |
| 4.90 | 33.00 | 11.30 | 0.06 | 6% | 0.002869 | 3.51E-03 | 0.3971 |

Table 3 shows data from the left rear control point, according to some embodiments of this invention. All values are averages.

According to some embodiments of this invention, one objective of this experiment is to determine the effect of changing pressure on mass flow rate. In order to do this, mass flow rate is derived from volume flow rate by using equation (3).

$$M_f = V_f * 1.225 \qquad \text{eqn. (3)}$$

In some embodiments of this invention, Equation 3 converts the volume flow rate ($V_f$) to mass flow rate ($M_f$) by multiplying volume flow rate by the density of air at standard conditions, 1.225 kg/m³/s.

| V out | P actual (psia) | Flow rate on meter (SCFM) | St. dev | Mean un-certainty | Flow rate (converted) m3/s | mass flow rate (kg/s) | flow co-efficient (Cv) |
|---|---|---|---|---|---|---|---|
| 2.50 | 15.00 | 0.93 | 0.11 | 12% | 0.000237 | 2.90E-04 | 0.2435 |
| 2.75 | 16.88 | 2.08 | 0.22 | 23% | 0.000529 | 6.48E-04 | 0.2054 |
| 3.00 | 18.75 | 3.55 | 0.56 | 59% | 0.000901 | 1.10E-03 | 0.2599 |
| 3.25 | 20.63 | 5.28 | 0.19 | 20% | 0.001341 | 1.64E-03 | 0.3228 |
| 3.50 | 22.50 | 6.03 | 0.07 | 8% | 0.001532 | 1.88E-03 | 0.3235 |
| 3.75 | 24.38 | 6.98 | 0.09 | 9% | 0.001773 | 2.17E-03 | 0.3377 |
| 4.00 | 26.25 | 8.08 | 0.12 | 13% | 0.002052 | 2.51E-03 | 0.3588 |
| 4.25 | 28.13 | 9.00 | 0.15 | 16% | 0.002285 | 2.80E-03 | 0.3710 |
| 4.50 | 30.00 | 10.05 | 0.21 | 22% | 0.002552 | 3.13E-03 | 0.3885 |
| 4.75 | 31.88 | 10.88 | 0.20 | 20% | 0.002763 | 3.39E-03 | 0.3960 |
| 4.90 | 33.00 | 11.50 | 0.19 | 20% | 0.002920 | 3.58E-03 | 0.4042 |

Table 4 shows data from the right rear control point, according to some embodiments of this invention. All values are averages.

FIG. 22 shows a graph displaying linear trend lines for mass flow rates vs. voltage of all four control points. According to some embodiments of this invention, the values used for calculating the trend line are the average values over six trials, and these values are found in FIGS. 22 and 23.

FIG. 23 shows a graph displaying linear trend lines for mass flow rates vs. air supply pressure of all four control points. This graph contains the same data as FIG. 22, however here the air supply pressure is graphed as the independent variable instead of the output voltage of the pressure sensors.

According to some embodiments of this invention, one objective of this investigation is to determine a calibration of supply pressure and mass flow rate through the four control points of the UAV model. To examine the degree of variance in the data, according to some embodiments of this invention, a T-test was performed and the mean uncertainty was calculated for a confidence interval of 95%. It is shown in column five as a percentage for each point. According to some embodiments of this invention, the equation used to calculate mean uncertainty can is shown in equation (4).

$$\text{Mean uncertainty} = \frac{S_{\frac{x}{2}, df} * \frac{\sigma}{\sqrt{N}}}{\bar{x}} \qquad \text{eqn. (4)}$$

According to some embodiments of this invention, the mean uncertainty, calculated with equation (4), relies on several factors determined by the data set, such as standard deviation (σ), the number of data points (N), the mean estimate M, and the distribution critical value (S). In some embodiments according to this invention, the (S) value is a constant determined by the desired one-tail confidence interval (x/2) and the degrees of freedom (df). Based on these two determinants, with an upper tail probability of 0.025 and df=5, the S constant is 2.571.

In some embodiments of this invention, with the flow rate data, the flow coefficient for each control point can be calculated. The flow coefficient is the measure of a device efficiency of allowing fluid flow. In some embodiments according to this invention, calculation of the flow coefficient with gases is done with one of two equations, depending on the pressure drop across the device.

According to some embodiments of this invention, if the outlet pressure of the device is less than ~0.53 times the inlet pressure, then the flow is choked. This means that flow rate through the devices reaches sonic velocity, and would be unable to increase regardless of a decrease in outlet pressure. This is true if the external pressure is lowered. However, if the upstream pressure is increased, then more mass flow can be pushed through the system. Choked flow results in a simpler equation (5).

$$q = 0.471 N_2 C_v P_1 \sqrt{\frac{1}{G_g T_1}} \qquad \text{eqn. (5)}$$

According to some embodiments of this invention, the choked flow equation (5) is a relation between volume flow rate, q, and the flow coefficient, $C_v$, given the temperature, the specific gravity of the gas, and the pressure upstream of the regulator. In some embodiments of this invention, this equation is used when the outlet pressure $P_2$ is less than ~0.53 times the inlet pressure $P_1$. Alternatively, in other embodiments of this invention, if the outlet pressure is greater than ~0.53 times the inlet pressure, then the flow coefficient equation is slightly more complicated and follows equation (6).

$$q = N_2 C_v P_1 \left(1 - \frac{2\Delta p}{3 p_1}\right) \sqrt{\frac{\Delta p}{p_1 G_g T_1}} \qquad \text{eqn. (6)}$$

According to some embodiments of this invention, equation (6) is the equation for non-choked flow and relates to the same variables as equation (5), but additionally this equation depends on outlet pressure. In some embodiments of this invention, this equation (6) is used when outlet pressure $P_2$ is greater than half of the inlet pressure $P_1$.

According to some embodiments of this invention, roughly one-half of the data points in the experiment were in the presence of choked flow and one-half without. Thus, both equations were applied to the data set appropriately and all four control points showed similar trends, as shown in FIG. 24.

Figure 24:
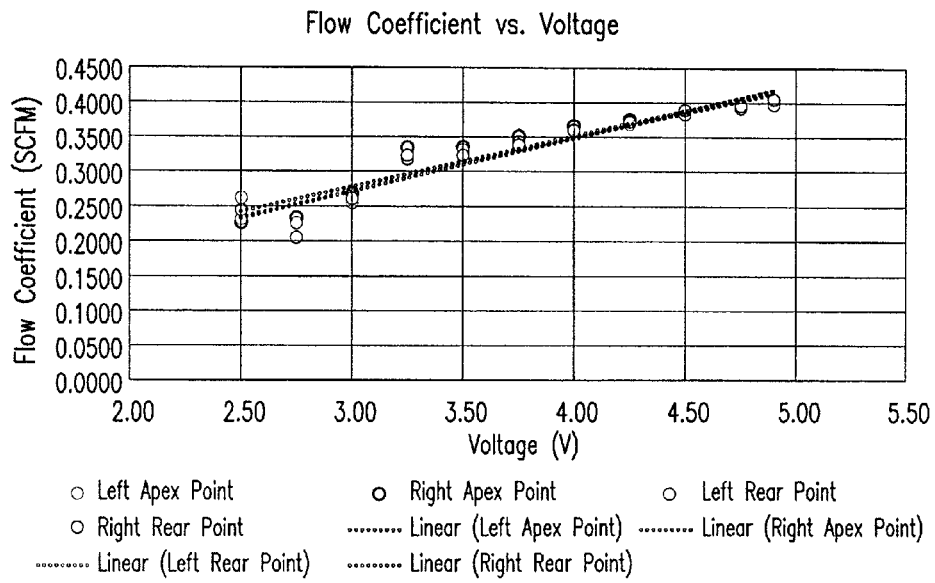
FIG. 24 shows a graph of flow coefficient vs. voltage, according to one embodiment of this invention.

FIG. 24 shows the effect of supply pressure, determined by voltage of pressure sensors, against flow coefficient of each control point, according to some embodiments of this invention. Lines of fit are shown for each set.

Figure 25:
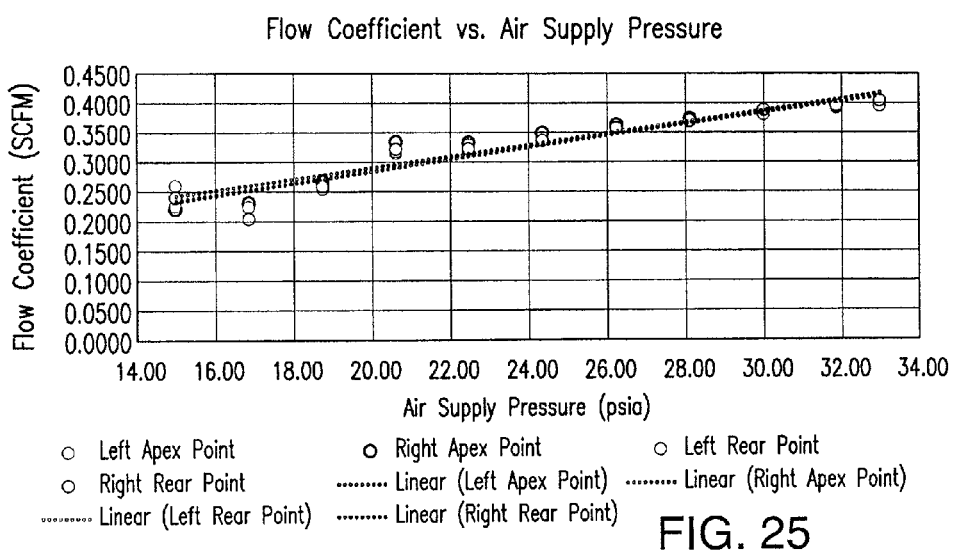
FIG. 25 shows a graph of flow coefficient vs. air supply pressure, according to one embodiment of this invention.

FIG. 25 shows the effect of air supply pressure on flow coefficient, according to some embodiments of this invention. FIG. 25 shows the same data as FIG. 24, but the graph of FIG. 25 uses air supply pressure as the independent variable instead of pressure sensor output voltage.

According to some embodiments of this invention, one effect of supply pressure on mass flow rates through the four control points of the UAV model is evaluated in order to obtain a calibration of mass flow rate against supply pressure. This is done, for example according to some embodiments of this invention, by recording volume flow rates over several supply pressure values, and converting the volume flow rates to mass flow rates based on the combined gas law. The volume flow rates were determined with a commercial flowmeter. Data was collected for each of the four control points over six trials. According to some embodiments of this invention, standard deviation and mean uncertainty was calculated for a confidence interval of 95% of all data points of all four control points, for example, using t-test. According to some embodiments of this invention, performance hardly varies between the different control points. Flow coefficients determined from all four sets of data indicate similar trends as well.

What is claimed is:

1. A method for controlling a yaw moment of a flight vehicle, the method including the steps of:
passing a first portion of a fluid through a first opening positioned at or near a first apex section of a first side of a flying wing of the flight vehicle; and
passing a second portion of the fluid through a second opening positioned at a distance from a second apex section of a second side of the flying wing, wherein the first side and the second side are on opposing sections of a centerline extending from a nose to a trailing edge of the flying wing.

2. The method of claim 1 further including the steps of passing a third portion of the fluid through a third opening positioned at or near the second apex section of the second side of the flying wing, and passing a fourth portion of the fluid through a fourth opening positioned at a distance from the first apex section of the first side of the flying wing.

3. The method of claim 2 further including varying a volume flow of the first portion, the second portion, the third portion or the fourth portion of the fluid to change the yaw moment of the flight vehicle.

4. The method of claim 3 wherein at least one sensor senses at least one input parameter and communicates a sensed signal to a control device to vary the volume flow and achieve a desired yaw moment of the flight vehicle.

5. The method of claim 2 wherein a fluid control device varies a volume flow of the first portion and the second portion of the fluid simultaneously to turn the flight vehicle in a first direction or the third portion and the fourth portion of the fluid simultaneously to turn the flight vehicle in a second direction different from the first direction.

6. The method of claim 1 wherein a pressure supply device simultaneously pressurizes and supplies the first portion and the second portion of the fluid so that the fluid flows into and discharges from the first opening and the second opening to an external surface of the flying wing.

7. The method of claim 6 wherein the pressure supply device is at least partially a power plant powering the flight vehicle.

8. The method of claim 1 further including passing a fifth portion of the fluid through a fifth opening in a first trailing section of the first side of the wing or passing a sixth portion of the fluid through a sixth opening in a second trailing section of the second side of the flying wing.

9. The method of claim 1 wherein the fluid passing through the first opening and the second opening contacts an external surface of the flying wing.

10. The method of claim 1 wherein the flight vehicle is tailless.

11. The method of claim 1 wherein the flight vehicle is aileronless.

12. An apparatus for controlling a yaw moment of a flight vehicle, the apparatus comprising:
a flying wing of the flight vehicle, a first side of the flying wing having a first opening positioned at or near a first apex section of the first side, a second side of the flying wing having a second opening positioned at a distance from a second apex section of the second side, a pressure supply device forming communication between a fluid supply and the first opening to pass a first portion of the fluid through the first opening and the second opening to pass a second portion of the fluid through the second opening, and the first side and the second side on opposing sections of a centerline extending from a nose to a trailing edge of the wing.

13. The apparatus of claim 12 further comprising the flying wing having a third opening positioned at or near the second apex section of the second side and a fourth opening positioned at a distance from the first apex section of the first side, and the pressure supply device forming communication between the fluid supply and the third opening to pass a third portion of the fluid through the third opening and the fourth opening to pass a fourth portion of the fluid through the fourth opening.

14. The apparatus of claim 13 further comprising a fluid control device controlling a volume flow from the fluid supply to the first opening, the second opening, the third opening or the fourth opening.

15. The apparatus of claim 12 further comprising at least one sensor sensing at least one input parameter and communicating a sensed signal to a control device to vary a volume flow of the first fluid or the second fluid and achieve a desired yaw moment of the flight vehicle.

16. The apparatus of claim 13 further comprising a fluid control device varying a volume flow of the first portion and the second portion of the fluid flow simultaneously to turn the flight vehicle in a first direction or varying the volume flow of the third portion and the fourth portion of the fluid flow simultaneously to turn the flight vehicle in a second direction different from the first direction.

17. The apparatus of claim 12 wherein the pressure supply device simultaneously supplies and discharges the first portion and the second portion of the fluid from the first opening and the second opening to an external surface of the flying wing.

18. The apparatus of claim 12 wherein the pressure supply device is at least partially a power plant powering the flight vehicle.

19. The apparatus of claim 12 further comprising a fifth opening in a first trailing section of the first side of the wing, a sixth opening in a second trailing section of the second side of the wing, and the pressure supply device forming communication between the fluid supply and the fifth opening to pass a fifth portion of the fluid through the fifth opening or the sixth opening to pass a sixth portion of the fluid through the sixth opening.

20. The apparatus of claim 12 wherein the fluid discharges from the first opening and the second opening and contacts an external surface of the flying wing.

21. The apparatus of claim 12 wherein the flight vehicle is tailless.

22. The apparatus of claim 12 wherein the flight vehicle is aileronless.

* * * * *